April 4, 1961   R. T. BURNETT   2,978,072
AUTOMATIC BRAKE ADJUSTOR
Original Filed June 1, 1954   5 Sheets-Sheet 1
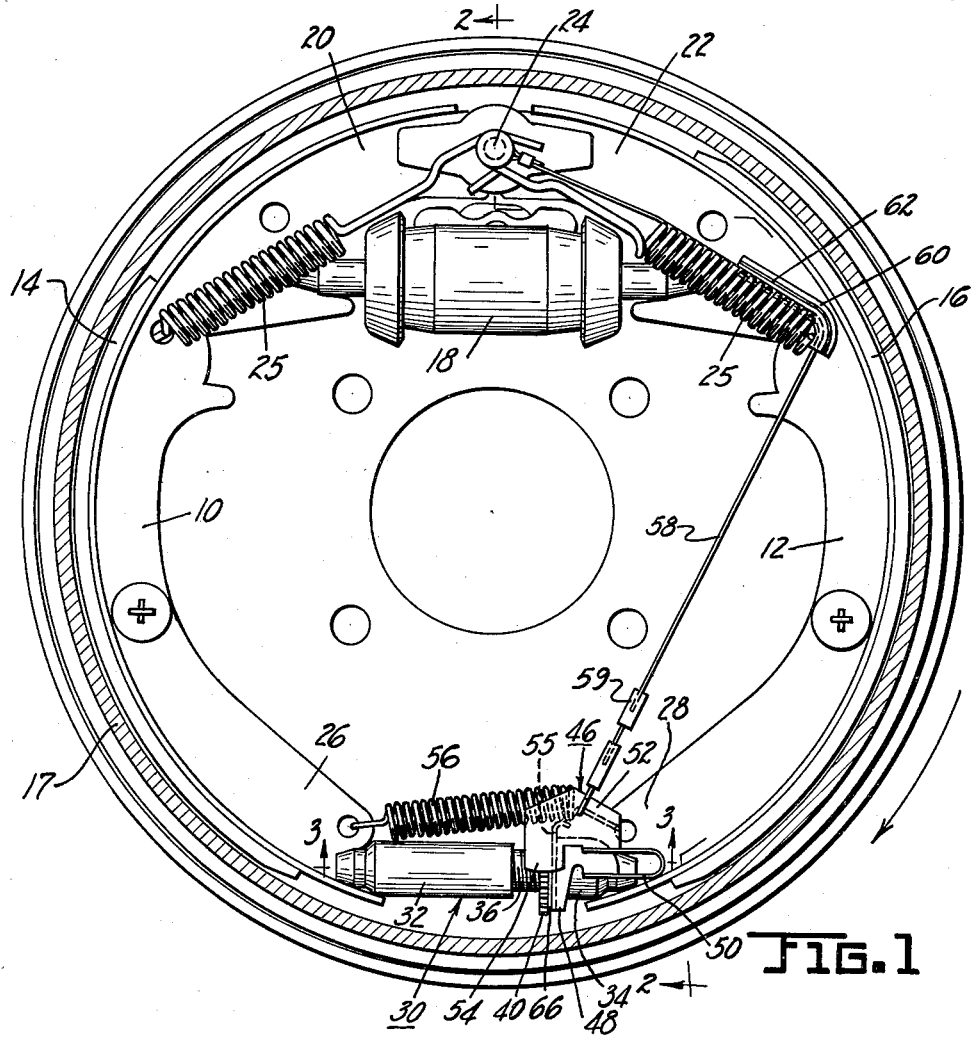
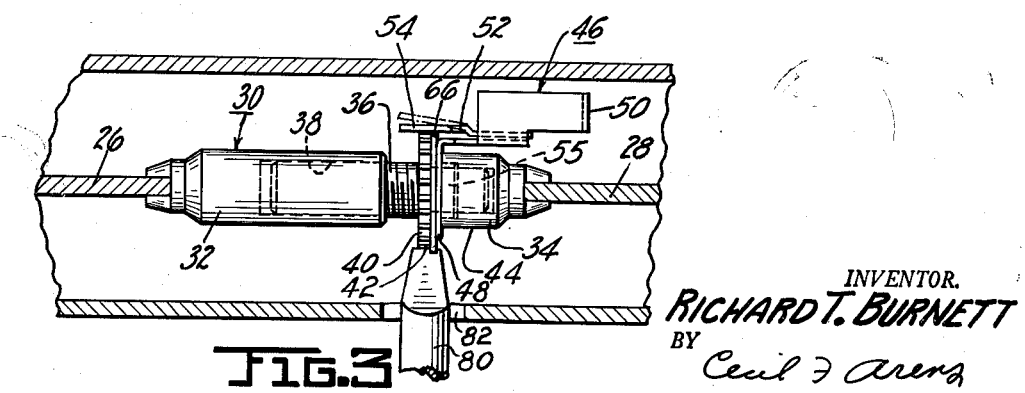
INVENTOR.
RICHARD T. BURNETT
BY Cecil F Arens
ATTORNEY April 4, 1961 R. T. BURNETT 2,978,072
AUTOMATIC BRAKE ADJUSTOR
Original Filed June 1, 1954 5 Sheets-Sheet 2
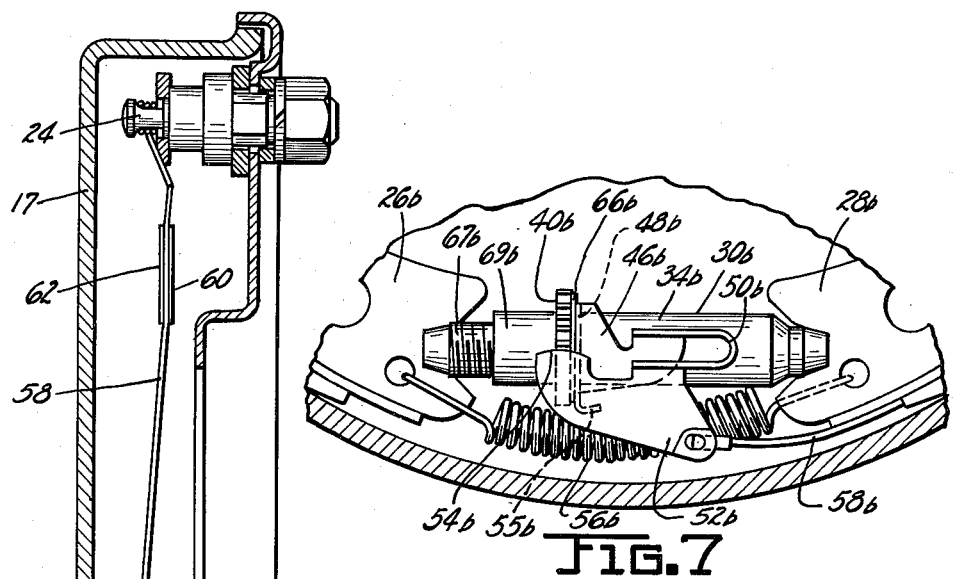
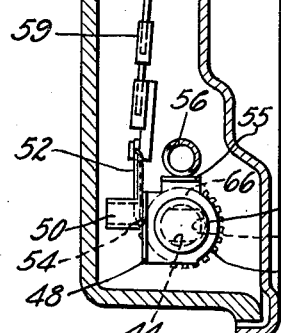
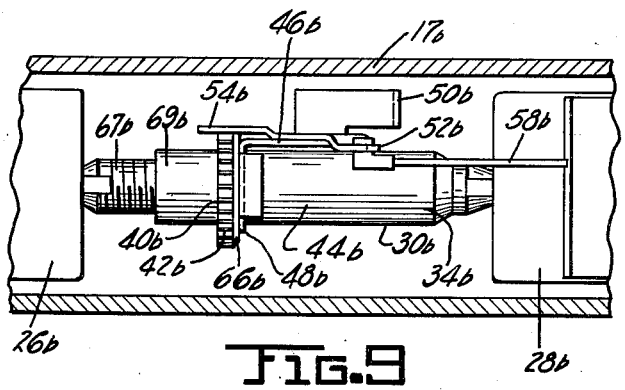
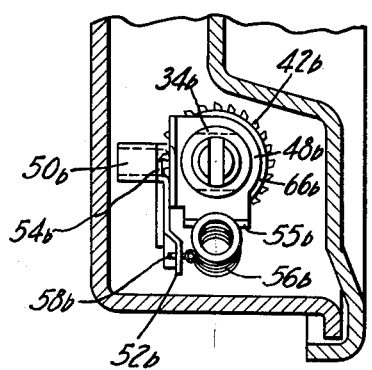
INVENTOR.
RICHARD T. BURNETT
BY Cecil J Arena
ATTORNEY

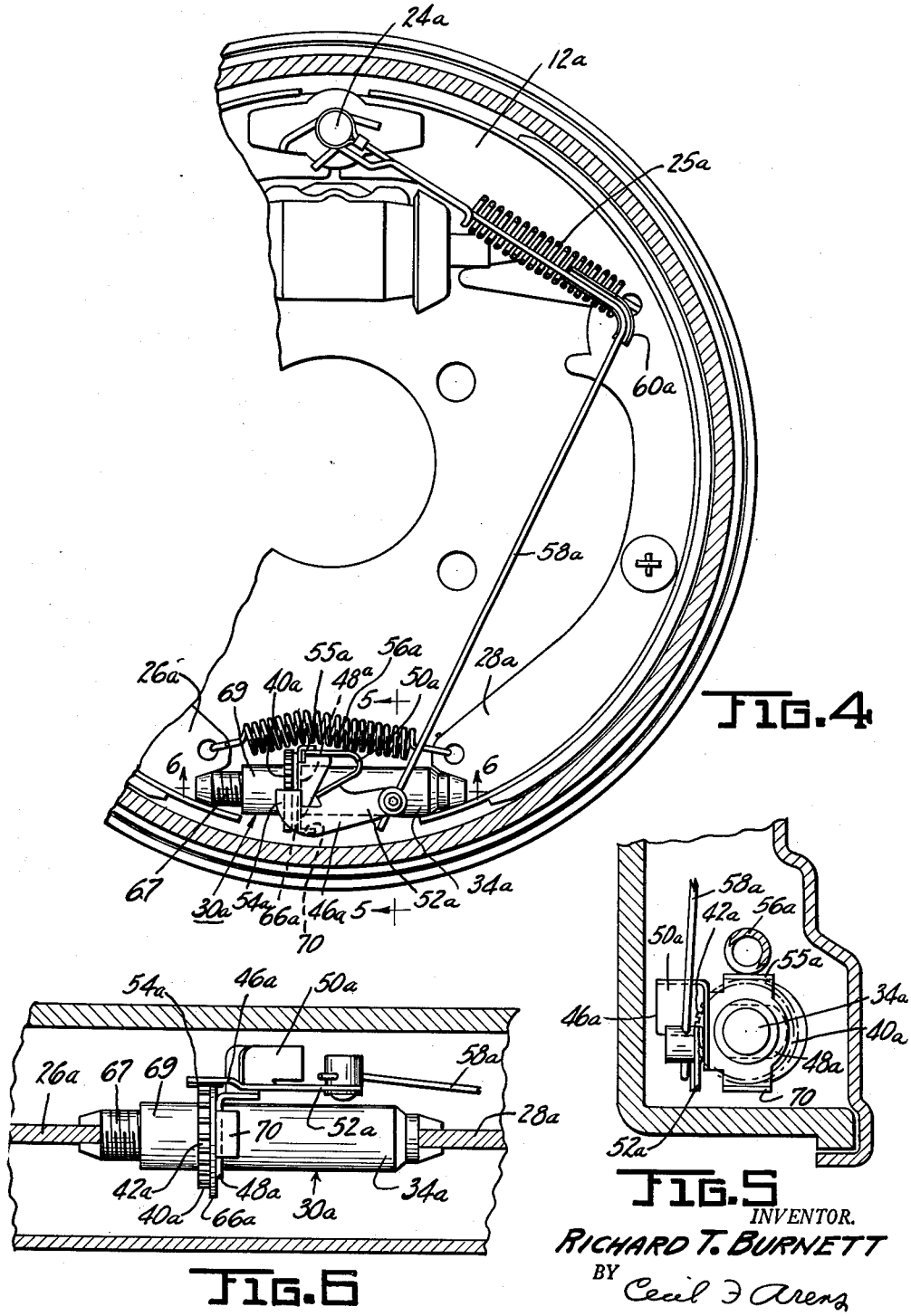

April 4, 1961  R. T. BURNETT  2,978,072
AUTOMATIC BRAKE ADJUSTOR
Original Filed June 1, 1954  5 Sheets-Sheet 4
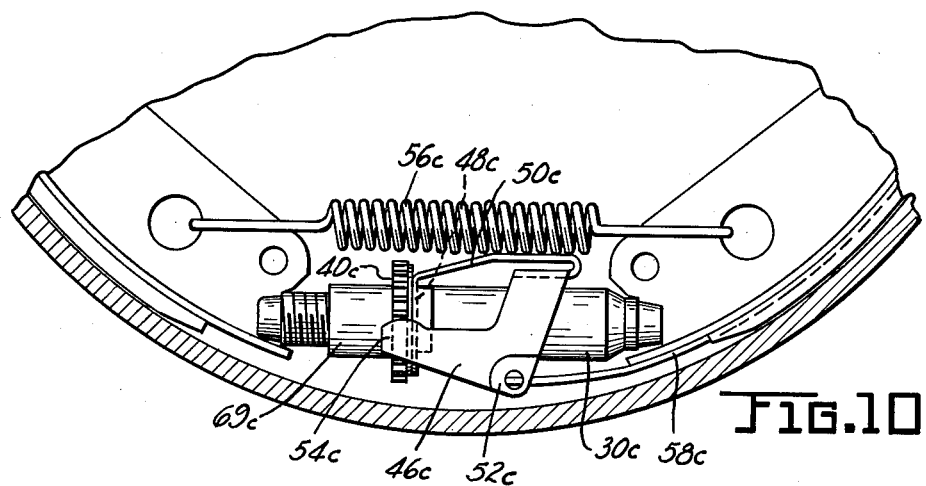
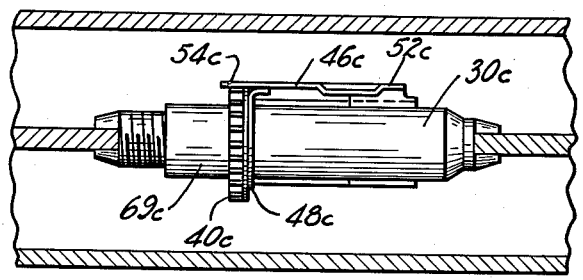
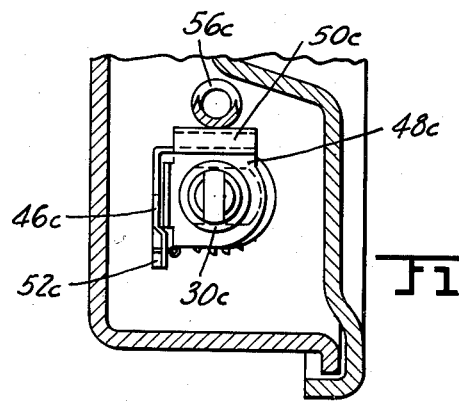
INVENTOR.
RICHARD T. BURNETT
BY
Cecil J. Arenz
ATTORNEY April 4, 1961  R. T. BURNETT  2,978,072
AUTOMATIC BRAKE ADJUSTOR
Original Filed June 1, 1954  5 Sheets-Sheet 5
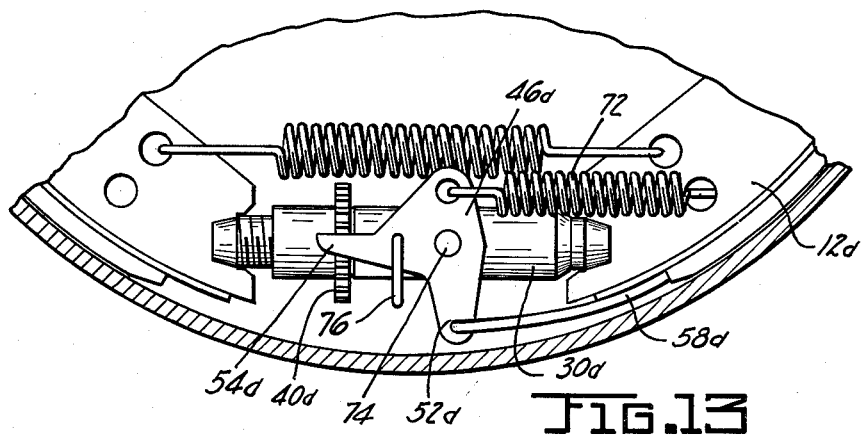
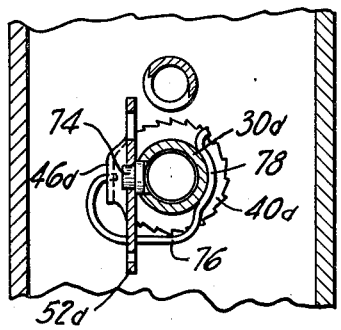
INVENTOR.
RICHARD T. BURNETT
BY
ATTORNEY

United States Patent Office 2,978,072
Patented Apr. 4, 1961

2,978,072

AUTOMATIC BRAKE ADJUSTOR

Richard T. Burnett, South Bend, Ind., assignor to The Bendix Corporation, a corporation of Delaware Continuation of abandoned application Ser. No. 433,363, June 1, 1954. This application June 4, 1958, Ser. No. 740,512

10 Claims. (Cl. 188—79.5)

This invention relates to automatic brake adjustors and more particularly to adjustors cooperable with internally expanding brakes having articulated shoe ends.

This application is a continuation of U.S. application Serial No. 433,363, filed June 1, 1954, now abandoned.

The problem of automatic adjustment of brake shoes has long been a concern in the braking art because of the increase in pedal travel which results from normal wear of the brake lining incident to its application. In order to solve this problem it has been proposed to effect an automatic adjustment of the brake shoes as a function of some one or other operating characteristic which is affected by lining wear e.g. the extent of shifting of the shoes circumferentially, the degree of pivotal actuation of the shoe about a given point, or the amount of travel of the pistons in a wheel cylinder. The prior art devices which have been used to accomplish automatic adjustment of brake shoes are generally inadequate either because they are inaccurate in degree of adjustment or they are too expensive in construction to be adopted and, therefore, remain impracticable.

It is a primary object of the present invention to overcome the deficiencies of prior automatic adjustors particularly in the matter of accuracy of adjustment so that the brake shoes will not be overadjusted.

Concurrently with the first object, it is my purpose to accomplish this accuracy of adjustment with a device which will be economical and feasible of manufacture within reasonable cost limits.

A further object of the invention is to adjust the brake through an actuating means which will render an adjustment according to the extent of movement of a friction-producing element which is directly related to piston travel in a wheel cylinder.

A still further object of the invention is to adjust the brake when the operating conditions are as temperate as possible.

A further object of the invention is to provide an adjustor which can be readily used with any size brake. Thus, by obtaining an adjustor which is readily interchangeable with different size brakes and eliminating necessity of stringent manufacturing tolerances, the cost of fabrication may be reduced considerably and a standard size adjustor may be made to fit any number of different size brakes.

The above and other objects and features of the invention will appear more fully hereinafter from a consideration of the following description, taken in connection with the accompanying drawings wherein a plurality of embodiments of the invention are illustrated by way of example.

In the drawings:

Figure 1 is a side elevation of a brake assembly illustrating in combination therewith an automatic adjustor embodying the present invention;

Figure 2 is a section view of the brake assembly and adjustor taken on the line 2—2 of Figure 1 with the brake shoe and wheel cylinder removed;

Figure 3 illustrates a bottom view of the adjustor taken on the line 3—3 of Figure 1;

Figure 4 is a fragmental side elevation of a brake assembly showing a second location of actuating means for a somewhat modified brake adjustor;

Figure 5 is a section view taken on the line 5—5 of Figure 4;

Figure 6 is a section view taken on the line 6—6 of Figure 4;

Figure 7 is a further embodiment of my automatic adjustor also showing a different location of actuating means for the adjustor;

Figures 8 and 9 are views taken on the right-hand side and bottom of the adjustor illustrated in Figure 7;

Figures 10, 11 and 12 represent a further embodiment of the invention showing in side elevation, right-hand view and bottom view, respectively, an automatic adjustor in combination with a pair of brake shoes; and, Figures 13 and 14 represent in side elevation and right-hand view thereof an automatic adjustor constituting a final embodiment of the invention.

Referring first to the embodiment shown in Figures 1 to 3, a pair of articulated T-section brake shoes 10 and 12 having friction material lining 14 and 16 are adapted for application against a rotatable drum 17 by a fluid motor 18 including a pair of oppositely acting pistons operatively connected to adjacent expansible ends 20 and 22 of the brake shoes 10 and 12. The two shoes 10 and 12 anchor on post 24 at either of the adjacent expansible ends 20, 22 depending upon the direction of drum rotation to be inhibited.

The brake may include suitable return springs such as those depicted at 25. The adjustor constituting the present invention is cooperable with articulated shoe ends 26 and 28 which are interconnected by a thrust link or strut 30.

The strut 30 consists of an adjusting nut 32 and socket 34 which engage articulated ends 26 and 28 and an externally threaded link 36 received in threaded opening 38 provided in nut 32. The link 36 has a transversely located ratchet wheel 40 provided with serrations 42 around the periphery thereof. Sides 44 of the socket 34 are formed as flats for a purpose later to be explained in this disclosure.

A one-piece adjusting mechanism designated generally by reference numeral 46 comprises a positioning portion 48, an integral U-shaped convolution 50, a lever portion 52 and a tooth 54 adapted to engage serrations 42 of star wheel 40. An integral projection 55 is provided to displace spring 56 from the ratchet wheel 40. The one piece adjusting mechanism 46 forms a bellcrank lever with the fulcrum at the apex of the input force which actuates the mechanism and the tooth 54.

To actuate the adjustor 46, I provide a flexible cable 58 connected at one end to the anchor post 24 and at the other end to the lever 52 of adjustor 46. Intermediate the ends of cable 58 is an operative connection with shoe 16 indicated at 60. The purpose of this operative connection 60 with shoe 16 is that actuation of the shoe 16 in one direction will produce tension of the cable 50 to actuate the adjustor 46. Operative connection of the cable with the shoe 16 is established by the simple expedient of lapping the cable over the return spring 25 associated with the shoe 16. To protect the cable 58 as it slides relative to the shoe spring, a shield 62 may be utilized preventing the cable 58 from sliding directly on the spring 25.

In order to minimize manufacturing tolerances involving sizes of the adjuster, braking shoes, backing plate, etc., I form the cable 58 to its approximate lengthwise dimension and then include an adjustable threaded fitting 59 to give desired tension in cable 58.

It will be noted from Figure 2 that the positioning portion 48 of the adjustor 46 is formed with flats preventing relative turning of the adjustor 46 on the strut 30. This construction of the adjustor also serves to limit sliding of the adjustor 46 toward the right (see Figure 1).

A washer 66 having an opening 68 is mounted on the socket 44 of strut 30 and located intermediate the ratchet wheel 40 and positioning portion 48 of the adjustor (Figures 2 and 3). The opening 68 in washer 66 is formed with flats corresponding to those on the sides 44 of the socket 34 to prevent relative turning therebetween; the opening 68 is proportioned, however, to permit lateral sliding movement of the washer 66 into abutment with the tooth 54 on adjustor 46. The purpose of this sliding movement of the washer 66 is to push the tooth 54 upwardly (Figure 3) to disengage it from the serrations 42 on the ratchet wheel 40.

Referring now to the embodiment illustrated in Figures 4 to 6, parts corresponding to those previously described will be referred to by the same reference numeral with the subscript $a$ affixed thereto.

Operatively connecting articulated shoe ends 26a and 28a is an adjustable strut, designated generally by reference numeral 30a. The adjustable strut 30a consists of a screw 67, an internally threaded sleeve 69 provided with serrated ratchet wheel 40a, and a socket 34a engaging the shoe end 28a and abutting with ratchet wheel 40a. Adjustor 46a and washer 66a are mounted on the cylinder 34a; flats on the cylinder 34a prevent turning of the washer and adjustor on the cylinder.

The adjustor 46a consists of a mounting portion 48a received on cylinder 34a, a U-shaped integral convolution 50a, a lever 52a operatively connected to a flexible actuating cable 58a and a tooth 54a adapted to engage serrations 42a formed on the periphery of the ratchet wheel 40a. The adjustor 46a may further include an integral projection 55a to displace the retaining spring 56a from the adjusting mechanism. Flange 70 is formed on the other side of the adjustor 46a to act as a stiffener.

The flexible actuating cable 58a is connected at one end to the anchor 24a at the other end to lever 52a, and is associated intermediate the ends thereof with a movable part of the brake assembly according to the arrangement shown at 60a where cable 58a is threaded through return spring 24a.

In the embodiment illustrated in Figures 7 to 9, a flexible actuating cable 58b is connected to an anchor post at one end and at the other end to applying lever 52b of adjustor 46b. The flexible actuating cable 58b is positioned between the lining and rim of the brake shoe.

A strut 30b operatively interconnects adjacent ends 26b and 28b of a pair of brake shoes. The adjustable strut 30b consists of a threaded screw 67b and cylinder 34b engaging shoe ends 26b and 28b; a sleeve 69b threadedly received on screw 67b; and a serrated ratchet wheel 40b abutting cylinder 34b. A portion of the sides 44b of the cylinder 34b are formed as flats to prevent turning of washer 66b and adjustor 46b which are mounted thereon.

The automatic adjustor 46b consists of a positioning portion 48b received on cylinder 34b, a lever portion 52b, a U-shaped resilient convolution 50b and a tooth 54b engaging serrations 42b formed on the periphery of the ratchet wheel 40b. A projection 55b may be provided to space retaining spring 56b away from the adjusting mechanism.

The operative connection of cable 58b with the lever 52b of adjustor 46b is designed so that a preferred amount of tension may be placed on the flexible actuator thus permitting use of the adjustor with different size brakes and eliminating stringent manufacturing tolerances.

In the embodiment illustrated in Figures 10 to 12 the same location of the actuating flexible cable and construction of the adjustable strut may be employed. The chief difference in this embodiment lies in the specific construction of the automatic adjustor 46c.

In this embodiment the U-shaped convolutions 50c which is formed integrally with the automatic adjustor is located in a manner spacing retaining spring 56c away from the interconnecting strut 30c. The adjustor 46c is mounted on the strut and the opening for mounting the adjustor on the strut is formed in a manner preventing turning of the adjustor thereon. The automatic adjustor 46c includes a lever portion 52c, tooth 54c and positioning portion 48c as in the previous embodiments.

It is to be understood that I do not limit myself to a U-shaped convolution formed integrally with the automatic adjustor as a means for retracting the tooth portion in engagement with the serrated star wheel. Any suitable construction of the desired resiliency may be included as a design preference.

As shown in Figures 13 and 14, automatic adjustor 46d may be provided with a helical spring 72 serving the function of the U-shaped convolutions illustrated in the prior embodiments. A lever 52d and tooth 54d, engaging serrations on the outer periphery of a ratchet wheel, are formed integrally with the automatic adjustor 46d. The automatic adjustor 46d is pivotally mounted at 74 on a portion of strut 30d and a retainer 76, positioned near the middle on adjustor 46d and encircling a portion of the strut at 78, maintains the adjustor 46d in operative position.

The operation of each of the automatic adjustors depends upon extent of wear of friction-producing elements, in these illustrations represented by brake shoes 10 and 12.

Assuming forward movement of the vehicle, producing counterclockwise rotation of the drum in Figure 1, normal wear of the lining 14 and 16 of brake shoes 10, 12 which is incident to their application against the rotating drum 17 causes an increase in shoe movement from retracted to applied position. The shoes are then adjusted in the next application of the brake with reverse vehicle motion. The purpose of adjusting the brake shoes solely with reverse direction of drum rotation is that lower speeds of the vehicle are encountered and the amounts of kinetic energy to be absorbed by the brake are accordingly much smaller than in forward braking. Since this is the case, an adjustment does not take place when the drum is overheated or the braking components are subjected to exceedingly high temperatures which cause thermal distortion and other heat phenomenon. Referring this to the problem of adjustment, the result is that the brake is adjusted under conditions wherein the drum and braking components are in substantially undistorted conditions so that the shoes do not assume a retracted position according to the dimensions of a thermally expanded brake drum (a merely temporary condition).

When the brake is applied while the drum is rotating clockwise (in reverse direction), the end 22 of shoe 12 is actuated by the wheel cylinder 18 away from an anchored position to apply lining 16 against the drum. The shoe 12 will also have circumferential movement in the direction of drum rotation as it applies shoe 10. This movement of the shoe 12 produces a tensile force on the flexible cable 58 which is attached at anchor 24 and is free to communicate this tensile force to the lever 52 of automatic adjustor 46. The connection 60 moves with shoe 12 away from the anchor 24; the cable 58, being attached to anchor 24, is forced to slide through connection 60. The force on the lever 52 exerted by the flexible cable 58 causes the tooth 54 to move upwardly and if the shoe 12 moves sufficiently, the tooth 54 is caused to engage a successive serration on the star wheel 40. The adjustor 46 is not free to turn on the socket 34 of the strut because of the flats 44 on cylinder 34.

When the brake is released the shoe 12 returns to retracted position relaxing tensile force on the flexible actuator 58. The U-shaped convolution 50 on adjustor 46 now urges the tooth 54 to retracted position causing the serrated wheel 40 to be rotated, advancing the threaded link 36 to the right and spreading the articulated ends of the shoes apart.

The U-shaped convolution 50 is so constructed that a lateral component of force is exerted on tooth 54, thus insuring a positive engagement of the tooth and serrations 42 to prevent the tooth 54 from slipping over the serrations 42 rather than causing rotation of the ratchet wheel 40.

Although each reverse application of the brake has the effect of turning of the lever 52 on automatic adjustor 46, an adjustment will not be effected unless the tooth 54 is moved far enough to engage a successive serration. In other words, there is a minimum shoe movement required before an adjustment is made and this shoe movement is a direct measure of the clearance established for the shoe from an applied position.

An adjustment of the brake shoe illustrated in Figures 4 to 6 is effected during an application of the brake with reverse vehicle motion. When the shoe 12a is actuated to an applied position thereby exerting tensile force on cable 58a, the tooth 54a is caused to travel in a downward direction, and if the distance through which the shoe is applied exceeds a predetermined amount, the shoe travel will be translated to equivalent rotary movement of lever 52a, causing the tooth 54a to engage a successive serration 42a on the ratchet wheel 40a.

When the brake is released and the shoe 12a returns to retracted position in contact with the anchor 24a, tensile force on the flexible actuator 58a is relieved and the U-shaped convolution 50a causes the tooth 54a to return to retracted position. Movement of the tooth 54a to retracted position produces rotary movement of the wheel 40a and sleeve 69 causing advancement of the sleeve 69 toward the right, and spreading apart of the articulate ends 26a and 28a of the shoes through adjustable strut 30a. Clearance of the shoe 12a from an applied position is established by the minimum distance through which the tooth 54a must travel before engaging a successive serration 42a on the periphery of the ratchet wheel 40a.

Turning now to Figures 7 to 9, the brake shoes are adjusted during application of the brake with reverse vehicle motion. The only difference in operation of this embodiment from that of the previous embodiments is the manner in which movement of the shoe to an applied position exerts tensile force on the flexible actuator 58b. In this example, contact of the flexible actuator 58b with the shoe is established along the entire arcuate length of the shoe. Movement of the shoe to an applied position exerts the tensile force on the actuator 58b which is required to produce turning of the lever 52b to contact the tooth 54b with successive serrations 42b. When the brake is released, tensile force is relaxed on the flexible actuator 58b thereby permitting the resilient U-shaped convolution 50b to turn the wheel 40b and spread the shoe ends apart through the adjustable strut.

To adjust the brake shoes illustrated in Figures 10 to 12, actuation of the shoe produces tensile force on the flexible actuator 58c. The force communicated by the actuator to lever 52c causes turning of the tooth 54c against the yieldable resistance of convolution 50c. The extent of shoe travel determines whether or not movement of the tooth 54c is sufficient to engage a successive serration 42c. When the brake is released, the tooth 54c is urged to retracted position by convolution 50c thus causing turning of the wheel 40c and sleeve 69c to spread the adjacent articulated shoe ends apart through the adjustable strut 30d.

In each of the embodiments illustrated in Figures 1 to 12, the brake may be manually adjusted. A suitable tool is inserted through the brake assembly to engage the serrations on the ratchet wheel on the side opposite the tooth portion of the adjustor. Before engagement of the tool can be established with these serrations, the tool contacts the washer mounted on the strut intermediate the automatic adjustor and ratchet wheel. The washer is free to move laterally causing the tooth to be pushed out of engagement with the serrations so that the wheel may be rotated when the tooth is out of locking position on the wheel. The resiliency of the convolution on the adjustor causes the tooth to re-engage the serrations when the manual adjustment of the shoes is completed.

In the next illustrated embodiment, shown in Figures 13 and 14, the brake shoes are adjusted during reverse braking, movement of shoe 12d exerting tensile force on flexible cable 58d to cause pivotal movement of automatic adjustor 46d on mounting 74. The pivotal movement of automatic adjustor 46d causes the tooth 54d to engage a successive serration, and when the brake is released the tensile force exerted by the shoe on the flexible cable 58d on the lever 52d is relieved. The spring 72 now causes opposite pivotal actuation of the automatic adjustor 46d moving the tooth 54d to its original position and thereby turning the serrated wheel 40d and effecting spreading of the articulated shoe ends through the adjustable strut 30d.

Although this invention has been described in connection with certain specific embodiments, the principles involved are susceptible of numerous other applications that will readily occur to persons skilled in the art.

I claim:

1. An automatic adjustor in combination with a pair of articulated brake shoes having adjacent expansible ends adapted to anchor alternatively at either expansible end on a fixed anchor located therebetween, said adjustor comprising an adjusting nut, a link threadedly received in said nut, a serrated wheel transversely located on said link, a resilient adjusting member including two portions in transverse planes, one of said portions being positioned on said link and provided with flats preventing rotational movement thereon, the other of said portions being deformable and engaging one of the serrations of said wheel, a flexible actuating means connected at one end to said fixed anchor and at the other end to the deformable portion of said adjustor, said flexible actuating means being operatively connected at a point intermediate the ends thereof with one of said brake shoes to produce deformation of said other portion according to the extent of movement of the brake shoe during shoe expansion to engage a successive serration on said serrated wheel, the resiliency of said other portion thereafter causing turning of said wheel and link to spread the articulated ends of the shoes apart when the brake is released, and means for disengaging said adjustor from the serrations of said wheel to permit manual adjustment of the brake.

2. An adjusting mechanism for a brake having a pair of articulated brake shoes with adjacent expansible ends, said mechanism comprising a strut interconnecting one pair of shoe ends, a link threadedly received in said strut, a ratchet wheel provided on said link, an adjustor having a transverse positioning portion mounted on said strut in a manner preventing relative rotary movement therebetween, a detent portion of said adjustor engageable with serrations on said ratchet wheel, a flexible actuator operatively interconnected between said adjustor and a fixed member adjacent the actuated ends of the shoes, said flexible actuator having association with one of the brake shoes to impart loading of a resilient portion of said adjustor whereby said detent portion engages a successive serration on said wheel when the shoe is actuated, said resilient portion causing turning of said wheel and link to spread the articulated shoe ends when the brake is released, and means having limited sliding movement on said strut and adapted to disengage the resilient portion of said adjustor and wheel to permit manual adjustment of the brake.

3. An automatic adjustor actuating mechanism comprising a flexible elongated member received between the lining and rim of a brake shoe, operative connection at one end of said member with a fixed member adjacent the actuated end of the shoe, and operative connection at the other end of said flexible member with an adjusting device, actuation of said shoe being adapted to impart a tensile force on said flexible member communicated therethrough to said adjustor device.

4. In a brake having primary and secondary brake shoes provided with adjacent expansible ends, an anchoring means located between said adjacent ends, an adjustor device interconnecting the other adjacent ends of said shoes and including a threaded rotatable member, a transverse serrated wheel fixed to said rotatable member, an internally threaded sleeve received on said threaded member and nonrotatably associated with the end of the primary brake shoe, a second sleeve nonrotatably associated with the end of the secondary brake shoe and having a socket which receive a portion of said rotatable member therein, an actuator mounted on said second sleeve and provided with an opening having flats engaging said second sleeve to prevent turning of said actuator on said second sleeve, said actuator including an integral detent porton disposed transversely to said serrated wheel and engageable with the serrated periphery of said wheel, a resilient convolution integrally connecting said detent and the mounting portion of said actuator and which tends to produce movement of said detent whereby said wheel is rotated, and a cable fastened to said anchor and said actuator, a part of said cable being passed over the secondary brake shoe in such a way that movement of the secondary brake shoe away from the anchor during reverse braking exerts a pulling effort on said actuator against the resistance of said convolution so that the detent is brought into engagement with a successive tooth on the serrated periphery of said wheel, release of the brake serving to relax said cable so that the resilient convolution can produce turning of the wheel to thereby adjust the interconnected ends of the primary and secondary brake shoes.

5. An automatic adjustor in combination with a pair of articulated brake shoes having adjacent expansible ends adapted to anchor alternatively at either expansible end on a fixed anchor located therebetween, said adjustor comprising an adjusting nut, a link threadedly received in said nut, a serrated wheel transversely located on said link, a resilient adjusting member including two portions in transverse planes, one of said portions being positioned on said link and provided with flats preventing rotational movement thereon, the other of said portions being deformable and engaging one of the serrations of said wheel, and a flexible actuating means connected at one end to said fixed anchor and at the other end to the deformable portion of said adjustor, said flexible actuating means being operatively connected at a point intermediate the ends thereof with one of said brake shoes to produce deformation of said other portion according to extent of movement of the brake shoe during shoe expansion to engage a successive serration on said serrated wheel, the resiliency of said other portion thereafter causing turning of said wheel and link to spread the articulated ends of the shoes apart when the brake is released.

6. An adjusting mechanism for a brake having a pair of articulated brake shoes with adjacent expansible ends, said mechanism comprising a strut interconnecting one pair of shoe ends, a link threadedly received in said strut, a ratchet wheel provided on said link, an adjustor having a transverse positioning portion mounted on said strut in a manner preventing relative rotary movement therebetween, a detent portion of said adjustor engageable with serrations on said ratchet wheel, and a flexible actuator operatively interconnected between said adjustor and a fixed member adjacent the actuated ends of the shoes, said flexible actuator having association with one of the brake shoes to impart loading of a resilient portion of said adjustor whereby said detent portion engages a successive serration on said wheel when the shoe is actuated, said resilient porting causing turning of said wheel and link to spread the articulated shoe ends when the brake is released.

7. In an automatic adjustor, an extendible strut having a serrated member turnable to effect a change of length of said strut, a single piece adjustor member having a transversely bent mounting leg with an opening for receiving said strut therethrough, flat sides of said opening for holding said leg in a plane perpendicular to said strut and against turning, a detent portion of said adjustor engaging the serrations of said serrated member to form a driving connection therewith, a deformable U-shaped convolution connected integrally and continuously with said mounting leg and detent respectively of said adjustor member and having opened positions wherein the U-shaped convolution is spread to provide engagement of said detent with successive serrations of said serrated member, said U-shaped convolution being thereafter restored to its original shape by the resilience thereof and returning said tooth to its original position causing turning of said serrated member.

8. An automatic adjustor and adjustor actuating means for a brake having primary and secondary brake shoes anchoring on an anchor between their actuated ends and adjustably interconnected at their opposite ends by an extendable strut having a serrated operating means, said adjustor actuating means comprising a flexible cable, means slidably connecting said cable intermediate the ends thereof with said secondary brake shoe, an operative connection between said cable and said anchor, means forming a connection between said cable and said adjustor which is disposed between the interconnected ends of said shoes, a detent engageable with said serrated operating means and forming a part of said adjustor, a lever for operating said detent at the adjustable interconnected ends of said primary and secondary brake shoes, spring means which are connected to said lever and stretched by loading of the cable effected from radial application of said primary and secondary brake shoes, and means mounting said spring means between the brake shoes for said stretching movement as said shoes are applied radially.

9. In a brake having a pair of brake shoes and anchoring means between the adjacent expansible ends of said shoes, an automatic adjustor for separating by increments the other adjacent pair of said shoe ends and including an extendible strut, a serrated wheel constructed transversely of said strut for turning movement effecting extension of said strut, a pawl engageable with said wheel means defining a center of pivotal movement of said pawl, deformable resilient means operatively connected to said pawl and expanded to provide engagement of said pawl with successive serrations of said wheel and of sufficient spring strength to produce rotation of said wheel through said pawl, means for mounting said resilient means between adjacent connected ends of said shoes, a flexible elongated cable connected at one end to said adjustor and operatively connected to said anchoring means to effect deforming of said resilient means responsively to expansion of said shoes, and means forming a slidable interconnection between said cable and one of said brake shoes to develop force in said cable which is held at its opposite ends by said anchoring means and adjustor to communicate actuating force to said adjustor as the shoes are moved outwardly.

10. An adjusting mechanism for a brake including a pair of articulated brake shoes with adjacent spreadable ends having anchorage means therebetween, said mechanism comprising a strut interconnecting one pair of shoe ends diametrically of said anchorage means and comprising a threaded link, a nut screwed over said link, a ratchet wheel on said link for turning the link, a bellcrank lever having a detent portion at one point engageable with serrations of said ratchet wheel, mounting means for said lever at a second point thereof and providing for angular movement in substantially a single plane and an actuated portion of said bellcrank lever constituting a third point thereon, resilient means loaded by actuatable movement of the spreadable shoe ends, and interconnected with said bellcrank lever to bring said detent into driving engagement with successive serrations of said ratchet wheel, said resilient means being of sufficient strength to return said detent to effect thereby turning of said ratchet wheel, means for mounting said resilient means between the adjacent interconnected ends of said shoes and a flexible actuator operatively connected to the anchor between said shoes and the actuated portion of said bellcrank lever, said flexible actuator also having a sliding connection with one of said shoes whereby expansion of the shoes exerts pulling along the length of the flexible actuator to produce turning of the bellcrank lever against the resistance of said resilient means and thereafter relaxing when the brake is released to effect said adjustment.

References Cited in the file of this patent

UNITED STATES PATENTS

| | | |
|---|---|---|
| 1,954,540 | Sanford | Apr. 10, 1934 |
| 2,066,077 | Sanford et al. | Dec. 29, 1936 |
| 2,243,469 | Moore | May 27, 1941 |
| 2,292,018 | Smith | Aug. 4, 1942 |
| 2,301,272 | Goepfrich | Nov. 10, 1942 |

OTHER REFERENCES

Automotive Industries publication, page 605, April 25, 1936.

UNITED STATES PATENT OFFICE
CERTIFICATE OF CORRECTION

Patent No. 2,978,072 April 4, 1961

Richard T. Burnett

It is hereby certified that error appears in the above numbered patent requiring correction and that the said Letters Patent should read as corrected below.

Column 8, line 2, for "porting" read -- portion --.

Signed and sealed this 19th day of September 1961.

(SEAL)
Attest:

ERNEST W. SWIDER
Attesting Officer

DAVID L. LADD
Commissioner of Patents